(12) United States Patent
Feng

(10) Patent No.: US 10,411,475 B2
(45) Date of Patent: Sep. 10, 2019

(54) CLOUD-BASED CONTROL FOR POWER DISTRIBUTION SYSTEM

(71) Applicant: ABB Schweiz AG, Baden (SE)

(72) Inventor: Xianyong Feng, Cary, NC (US)

(73) Assignee: ABB Schweiz AG, Baden (CH)

( * ) Notice: Subject to any disclaimer, the term of this patent is extended or adjusted under 35 U.S.C. 154(b) by 261 days.

(21) Appl. No.: 15/441,690

(22) Filed: Feb. 24, 2017

(65) Prior Publication Data

US 2017/0250539 A1 Aug. 31, 2017

Related U.S. Application Data

(60) Provisional application No. 62/300,330, filed on Feb. 26, 2016.

(51) Int. Cl.
*H02J 3/38* (2006.01)
*H02J 13/00* (2006.01)
*H02J 3/00* (2006.01)

(52) U.S. Cl.
CPC .......... *H02J 3/383* (2013.01); *H02J 13/0017* (2013.01); *H02J 13/0075* (2013.01); *H02J 2003/003* (2013.01); *Y02B 10/14* (2013.01); *Y02B 90/2653* (2013.01); *Y02E 10/563* (2013.01); *Y02E 40/72* (2013.01); *Y04S 10/123* (2013.01); *Y04S 40/126* (2013.01)

(58) Field of Classification Search
CPC ............ G05B 15/02; G05B 2219/2613; G05B 2219/25323; G05B 2219/2642
USPC .............................. 700/19, 28, 276, 278, 291
See application file for complete search history.

(56) References Cited

U.S. PATENT DOCUMENTS

| 8,019,445 | B2 | 9/2011 | Marhoefer |
| 8,938,320 | B2 | 1/2015 | Ooba et al. |
| 9,082,141 | B2 | 7/2015 | Meyerhofer et al. |
| 9,200,621 | B2 | 12/2015 | Lazaris |

(Continued)

OTHER PUBLICATIONS

Residential Real Time Pricing Program, http://www.pluginillinois.org/realtime.aspx, Plug in Illinois, 2013.

(Continued)

*Primary Examiner* — Michael J Brown
(74) *Attorney, Agent, or Firm* — Taft Stettinius & Hollister LLP; J. Bruce Schelkopf

(57) ABSTRACT

Unique systems, methods, techniques and apparatuses for cloud-based control for power distribution systems are disclosed. One exemplary embodiment is a system comprising a microprocessor-based power management system in operative communication with a plurality of buildings located remotely from the power management system and a plurality of communication interface devices provided at corresponding ones of the plurality of buildings. The power management system is structured to perform a plurality of building unit-specific optimizations, evaluate a net power demand on the electrical power grid, reduce the net power demand on the electrical power grid while minimizing disruption to the resident-defined preference parameters, and transmit to each of the plurality of interface devices the one or more additional control commands corresponding to the specific building at which each interface device is provided.

20 Claims, 3 Drawing Sheets

(56) References Cited

U.S. PATENT DOCUMENTS

| | | | |
|---|---|---|---|
| 2005/0102068 A1* | 5/2005 | Pimputkar | H02J 3/14 |
| | | | 700/291 |
| 2005/0194456 A1* | 9/2005 | Tessier | G05B 13/02 |
| | | | 236/51 |
| 2010/0145532 A1 | 6/2010 | Gregory et al. | |
| 2012/0130556 A1 | 5/2012 | Marhoefer | |
| 2013/0046668 A1 | 2/2013 | Al Faruque et al. | |
| 2013/0060471 A1 | 3/2013 | Aschheim et al. | |

OTHER PUBLICATIONS

B. Sun, P. B. Luh, Q. Jia, Z. Jiang, F. Wang, and C. Song, "An integrated control of shading blinds, natural ventilation, and HVAC system for energy saving and human comfort," in 6th Annual IEEE Conference and Automation Science and Engineering, Aug. 2010.

Y. Ma, A. Kelman, A. Daly, and F. Borrelli, "Predictive control for energy efficient buildings with thermal storage—modeling, simulation, and experiments," IEEE Control System Magazine, pp. 44-64, Feb. 2012.

X. Guan, Z. Xu, and Q. Jia, "Energy-efficient buildings facilitated by microgrids," IEEE Tran. Smart Grid, vol. 1, No. 3, pp. 243-252, Dec. 2010.

* cited by examiner

Monitoring data table for building j

| ID | PV gen. (kW) | room temp. (°C) | water heater temp. (°C) | PV status | AC mode | AC status | ... | date | time |
|---|---|---|---|---|---|---|---|---|---|
| i | 1.20 | 24.9 | 70.2 | on | cooling | on | ... | 10/26/2013 | 12:05 pm |
| i+1 | 1.25 | 24.7 | 70.1 | on | cooling | off | ... | 10/26/2013 | 12:10 pm |
| ... | ... | ... | ... | ... | ... | ... | ... | ... | ... |
| k | 0 | 23.1 | 65.1 | off | cooling | off | ... | 10/26/2013 | 9:55 pm |
| ... | ... | ... | ... | ... | ... | ... | ... | ... | ... |

Configuration data table for building j

| Time | 0 | 1ᵃₘ | 2ᵃₘ | 3ᵃₘ | 4ᵃₘ | 5ᵃₘ | 6ᵃₘ | 7ᵃₘ | 8ᵃₘ | 9ᵃₘ | 10ᵃₘ | 11ᵃₘ | 12ᵖₘ | 1ᵖₘ | 2ᵖₘ | 3ᵖₘ | 4ᵖₘ | 5ᵖₘ | 6ᵖₘ | 7ᵖₘ | 8ᵖₘ | 9ᵖₘ | 10ᵖₘ | 11ᵖₘ |
|---|---|---|---|---|---|---|---|---|---|---|---|---|---|---|---|---|---|---|---|---|---|---|---|---|
| 401 Max room temp (°C) | 27 | 27 | 27 | 27 | 27 | 26 | 26 | 26 | 26 | 30 | 30 | 30 | 30 | 30 | 30 | 30 | 26 | 26 | 26 | 26 | 26 | 26 | 26 | 27 | 27 |
| 403 Min room temp (°C) | 17 | 17 | 17 | 17 | 17 | 18 | 18 | 18 | 18 | 15 | 15 | 15 | 15 | 15 | 15 | 15 | 18 | 18 | 18 | 18 | 18 | 18 | 18 | 17 | 17 |
| 405 Min water heater temp (°C) | 40 | 40 | 40 | 40 | 40 | 50 | 50 | 50 | 50 | 35 | 35 | 35 | 35 | 35 | 35 | 35 | 50 | 50 | 50 | 50 | 50 | 50 | 50 | 40 | 40 |
| 407 Max water heater temp (°C) | 65 | 65 | 65 | 65 | 65 | 65 | 65 | 65 | 65 | 65 | 65 | 65 | 65 | 65 | 65 | 65 | 65 | 65 | 65 | 65 | 65 | 65 | 65 | 65 | 65 |

US 10,411,475 B2

CLOUD-BASED CONTROL FOR POWER DISTRIBUTION SYSTEM

CROSS REFERENCE TO RELATED APPLICATION

This application claims priority under 35 U.S.C. 119(e) from U.S. provisional patent application No. 62/300,330 filed on Feb. 26, 2016, entitled "Cloud-Based Control for Power Distribution Systems" which is hereby incorporated by reference in its entirety.

STATEMENT OF GOVERNMENT INTEREST

The subject matter disclosed in this patent application was developed under U.S. Department of Energy Contract No. DE-EE0006036. The U.S. Government has certain rights in this patent application.

BACKGROUND

The present disclosure relates generally to a cloud-based power management system for a power distribution system. Power distribution systems, such as a utility grid, experience predictable peaks in power demand. Certain time periods of peak power demand exceed the power generation capabilities of a power distribution system's primary power generators, temporarily requiring the use of supplementary power generators. The purpose of a power management system is to reduce or eliminate the use of supplementary power generators by reducing power demand peaks. Existing power management systems suffer from a number of shortcomings and disadvantages. There remain unmet needs including cost reduction, inefficient demand reduction, optimized power and load forecasting, and reliability. For instance, some power management systems require expensive hardware components to be located in each building. Other power management systems fail to minimize the effect of load disturbance throughout the power distribution system. There is a significant need for the unique apparatuses, methods, systems and techniques disclosed herein.

SUMMARY

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Exemplary embodiments include unique systems, methods, techniques and apparatuses for a power distribution system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
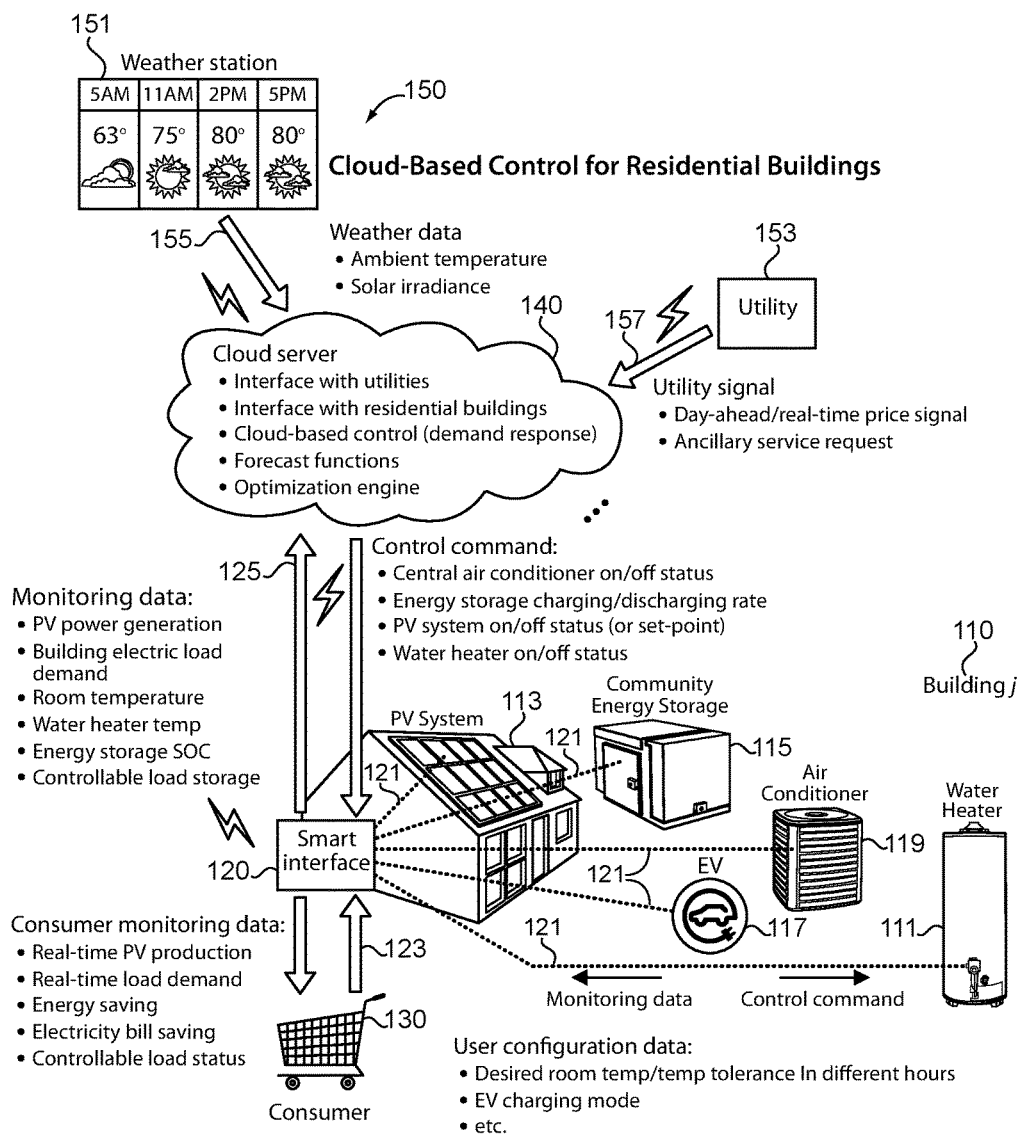
FIG. 1 illustrates an exemplary power distribution system.

With reference to FIG. 1 there is illustrated an exemplary power distribution system 100. It shall be appreciated that system 100 may be implemented in a variety of power distribution networks, such as a utility grid having a variety of residential, commercial, and industrial buildings.

System 100 includes a building 110 coupled to a utility grid (not pictured). In other embodiments, system 100 includes a plurality of buildings, each building having features analogous to the features of building 110 described herein. Building 110 includes a thermal storage device 111 structured to receive electric power, convert the electric power to thermal energy, and store the thermal energy. In the illustrated embodiment, thermal storage device 111 is a water heater structured to receive electric power, convert the electric power into thermal energy in the form of heated water, store the thermal energy, and selectively provide the heated water. Thermal storage device 111 could also be a refrigeration unit, a freezer unit, an ice storage unit, an air conditioning unit, an cryogenic energy storage unit, or any other type of device structured to store thermal energy.

Building 110 includes a distributed energy resource (DER) 113. In the illustrated embodiment, DER 113 is a photovoltaic array structured to receive solar irradiance, to convert the solar irradiance into electric power, and to selectively provide power to either the utility grid or one of the devices and loads associated with building 110. In other embodiments, DER 113 is a wind turbine, a gas generator or any other type of device structured to provide energy to a load.

Building 110 also includes an energy storage device 115. In the illustrated embodiment, energy storage device 115 is a community energy storage device associated with building 110 and structured to selectively receive electric power, store electric energy, and selectively provide electric energy. Energy storage device 115 may be associated with a plurality of buildings. Energy storage device 115 may be be a battery bank, capacitor bank, flywheel, electric vehicle onboard battery or any other device structured to store electrochemical energy, electrical energy, or mechanical energy.

Building 110 includes an electric vehicle charging station 117 structured to provide electrical energy to the battery of an electric vehicle and receive electric energy from the electric vehicle battery.

Building 110 includes a thermal load 119. In the illustrated embodiment, load 119 is a heating, ventilation, and air conditioning (HVAC) unit structured to receive electric power, heat or cool air, and provide the conditioned air to building 110. In other embodiments, thermal load 119 could also be a refrigeration unit, a freezer unit, a water heater, a thermal storage device, or any other type of device structured to maintain a certain temperature within a defined area of building 110. In certain embodiments, building 110 may not include a distributed energy resource 113, an energy storage device 115, or a charging station 117.

Building 110 is associated with an interface device 120 structured to communicate with thermal storage device 111, distributed energy resource 113, energy storage device 115, charging station 117, and thermal load 119 by way of a plurality of communication channels 121. The plurality of communication channels may pass information by way of wired or wireless data transmission. Interface device 120 is structured to monitor devices 111, 113, 115, and 117. For example, interface device 120 may monitor the power generation of DER 113, the power consumed by charging station 117, the room temperature maintained by thermal load 119, the water temperature of thermal storage device 111, and the state of charge of energy storage device 115.

Interface device 120 is also structured to communicate with a user 130. In the illustrated embodiment, user 130 interacts with device 120 by way of a computing device having a user interface. User 130 may also communicate directly with device 120 by way of an input/output device such as a touchscreen. For example, device 120 may provide data to user 130 related to real-time photovoltaic energy generation of DER 113, real-time load demand of charging station 117, energy savings data, and electricity bill savings data. User 130 may also transmit constraint data to interface device 120. For example, user 130 may define an acceptable room temperature operating range for thermal load 119 or an acceptable state of charge range for the battery of the electric vehicle. As described below in more detail, interface device 120 is additionally structured to control devices 111, 113, 115, and 117 so as to minimize the energy cost to user 130 while adhering to the user-defined constraints. For example, interface device 120 may control the on/off status of thermal load 119, the energy charging or discharging rate of energy storage device 115, the on/off status of DER 113, or the on/off status of the thermal storage device 111.

System 100 includes a power management system 140, also known as a central load controller, structured to communicate with interface device 120. For example, interface device 120 may transmit monitoring data, control status data, and user-defined constraint data to system 140. Power management system 140 includes a microprocessor-based device located remotely from building 110. In the illustrated embodiment, system 140 includes a cloud server. Power management system 140 is also structured to communicate with a plurality of external data sources 150. In the illustrated embodiment, external data sources 150 include a weather station 151 and a utility grid 153. Weather station 151 is structured to transmit weather data to power management system 140, such as ambient temperature and solar irradiance. Utility grid 153 is structured to transmit day-ahead or real-time electricity prices, as well as requests for ancillary service. In other embodiments, external data sources 150 may include a plurality of weather stations or utility grids, or may include additional data sources structured to transmit data to power management system 140.

Power management system 140 is structured to store the data received from interface device 120 and external data sources 120, use the data to forecast future power demand, and reduce or eliminate the need to operate auxiliary power generators. Specifically, system 140 is structured to forecast a future aggregate power demand peak of the power distribution system 100; generate a thermal model for the thermal load 119 and thermal energy storage device 111; generate a plurality of optimized load commands based on the forecasted aggregate power demand, thermal models, and constraint data with the power management system 140; and transmit each load command to the thermal load 119 or the thermal energy storage device 111 by way of the interface device 120. The load commands include a set of instructions to precool or preheat the thermal load 119 or thermal energy storage device 111 within the user-defined constraints before the time period when the forecasted aggregate power demand peak is forecasted to occur. The load commands are optimized such that the deviation from the non-disturbed condition of the thermal load 119 and thermal energy storage device 111 is minimally sufficient to eliminate the need to operate the auxiliary power generators.

The power management system 140 may also be structured to reduce the forecasted demand peak by operating energy storage device 115 and distributed energy resource 113. Specifically, system 140 is structured to generate a plurality of optimized operation commands based on the forecasted aggregate power demand, thermal models, and constraint data; and transmit each of the operation commands to distributed energy resource 113 or energy storage device 115 by way of interface device 120. Generally, the operation commands are a set of instructions structured to store power generated by distributed energy resource 113 with energy storage device 115 in anticipation of providing the stored power to building 110 during a forecasted peak demand time period.

In addition to anticipating and reducing the ancillary service period, power management system 140 is also structured to reduce the cost of power consumption for user 130. Specifically, system 140 is structured to receive utility grid pricing data and transmit a plurality of operation commands to energy storage device 115 by way of interface device 120 and a plurality of load commands to thermal load 119 or thermal storage device 111 by way of interface device 120, the operation commands and load commands each having a set of instructions to operate energy storage device 115, thermal load 119, or thermal storage device 11 so as to minimize the cost of power received at building 110 from the utility grid.

When the utility grid does not require load disturbance, also known as ancillary service, from power management system 140, the primary objective of power management system 140 is the reduction of energy cost to user 130. During this time, power management system 140 does not attempt to reduce aggregate power demand. Once utility grid 153 transmits an ancillary service request to power management system 140, the primary objective of power management system 140 becomes the reduction of aggregate power demand peaks. At this time power management system 140 optimally determines which loads should be disturbed. As soon as the ancillary service is unnecessary, the primary objective of power management system 140 once again becomes the reduction of energy cost to the user 130.

It shall be appreciated that any or all of the foregoing features of system 100 may also be present in the other embodiments disclosed herein. Specifically, the features of building 110, interface device 120, and power management system 140 may be present in the other buildings, interface devices and power management systems disclosed herein.

Figure 2:
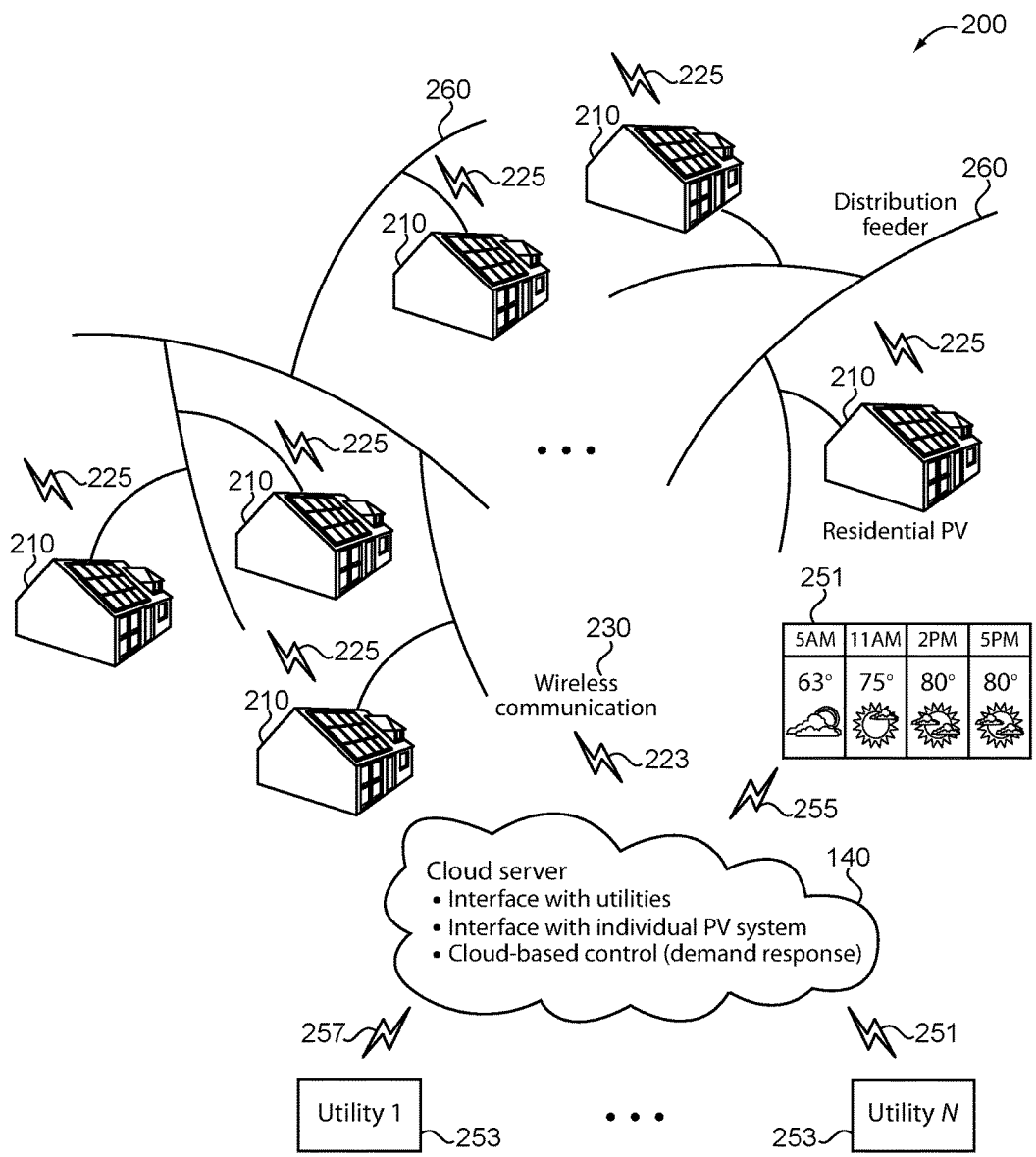
FIG. 2 illustrates an exemplary power distribution system having a plurality of buildings.

With reference to FIG. 2 there is illustrated an exemplary power distribution system 200 having a plurality of buildings 210, each building similar to building 110 of FIG. 1. System 200 includes a plurality of distribution feeders 260 electrically coupled with the plurality of buildings 210, each having an associated interface device (not pictured). A power management system 240 is structured to communicate with each of the interface devices by way of a plurality of communication channels 225. Power management system 240 is additionally structured to communicate with a plurality of utility grids 253 by way of a plurality of communication channels 251 and a weather station by way of communication channel 255. System 140 is additionally structured to communicate with a user 230 by way of communication channel 223.

Figures 3, 4, 5:
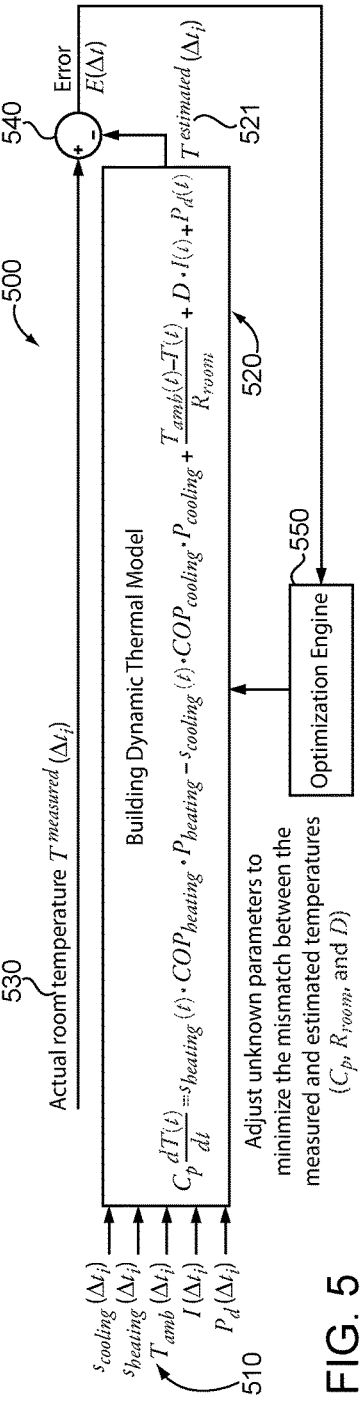
FIG. 3 is a table illustrating monitoring data collected by an exemplary interface device.
FIG. 4 is a table illustrating constraint data stored in memory with an exemplary cloud-based power management system.
FIG. 5 is a diagram illustrating dynamic thermal model optimization.

With reference to FIG. 3 there is a table 300 illustrating the data collected by an interface device, such as interface device 120 of FIG. 1. Table 300 includes a plurality of rows 301, each row including information related to building devices 111, 113, 115, and 119 observed in one time interval. In table 300, data is collected from each building device in five minute intervals. In other embodiments, the time interval may be shorter or longer. The data in each row corresponds to the devices associated with building 110 as interface device 120. In table 300, the data collected by interface device 120 includes the photovoltaic power generation of DER 113, the room temperature maintained by thermal load 119, the water heater temperature of thermal storage device 111, the on/off status of DER 113, the on/off status of thermal load 119, the date of the observation, and the time of the observation.

With reference to FIG. 4 there is a table 400 illustrating constraint data entered by a user, such as user 130 in FIG. 1. Table 400 includes rows 401 and 403, which include room temperature constraints for hourly intervals, the room temperature begin maintained by an HVAC unit, such as thermal load 119 of FIG. 1. Table 400 also includes rows 405 and 407, which include water temperature constraints for hourly intervals, the water temperature being maintained by a water heater, such as the thermal storage device 111 of FIG. 1.

With reference to FIG. 5 there is illustrated a dynamic thermal model optimization algorithm 500 for an air conditioning unit. In order to comply with the user-defined constraints, a power management system, such as system 140 in FIG. 1, must be able to accurately predict the effect of a change in the on/off status of a thermal load with respect to the operating temperature. A thermal model 520 is created to predict the operating temperature of a thermal load in a given situation. Thermal model 520 includes a plurality of known parameters 510 and unknown parameters. The known parameters 510 include the control status of the air conditioning unit, the ambient temperature, the solar irradiance, and the heat generated by other energy sources, which can be estimated by the number of people and the electricity consumption in the building. The unknown parameters include the air conditioner coefficient of performance, the power demand for an operating air conditioner, the thermal capacitance, and the coefficient for solar irradiance.

The power management system is structured to accurately generate a thermal model to estimate an expected temperature 521 by assigning a weighted value to each unknown parameter. The dynamic thermal model 520 can be expressed in accordance with the formula of equation (1):

$$C_P dT(t)/dt = [S_{heating}(t) \cdot (l) \cdot COP_{heating} \cdot P_{heating} - S_{cooling}(t) \cdot COP_{cooling} \cdot P_{cooling}] + [T_{amb}(t) - T(t)/R_{room}] + D \cdot I(t) + P_d(t) \quad (1)$$

The variables in equation 1 are defined as follows:
$C_P$: thermal capacitance (or thermal mass/inertia) for the thermal zone in the building (kJ/K);
$T(t)$: room temperature (K);
t: time (sec);
$S_{heating}(t)$: control status of the air conditioner in heating mode (1: heating mode, and 0: idle);
$COP_{heating}$: air conditioner coefficient of performance in heating mode;
$P_{heating}$: electric power demand of the air conditioner in heating mode (kW);
$S_{cooling}(t)$: control status of the air conditioner in cooling mode (1: cooling mode, and 0: idle);
$COP_{cooling}$: air conditioner coefficient of performance in cooling mode;
$P_{cooling}$: electric power demand of the air conditioner in cooling mode (kW);
$T_{amb}(t)$: ambient temperature (K);
$R_{room}$: thermal resistance between the thermal zone and the outdoor air;
D: coefficient for solar irradiance;
$I(t)$: solar irradiance (kW/m$^2$);
$P_d(t)$: heat generated by other energy sources (kW).

Thermal model 520 is optimized by comparing the thermal model results to historical data 530 and adjusting the weighted value for one or more of the unknown parameters so as due reduce a margin of error 540 between thermal model 520 and the actual temperature. The optimization of thermal model 520 may be computed using publicly available optimization software or commercially available software as is known in the art. Historical data 530 includes observed room temperature, air conditioning on/off status, ambient temperature, soar irradiance, and heat generated by other sources. The assigned weighted values for the unknown parameters are determined by an optimization engine 550. The sum of squared error of the actual room temperature and estimated room temperature is used as the objective function in optimization algorithm 550 to minimize the margin of error 540. In one embodiment, the Nelder-Mean simplex is used to identify the unknown parameters. Historical values for the unknown parameters may be used as initial values for the unknown parameters. In other embodiments, optimization engine 550 includes genetic algorithms or particle swarm optimization. Parameter identification may be partially performed at night, when solar irradiance is zero, to identify some unknown parameters, then performed using day time data to identify the remaining unknown parameters. A thermal model 520 may be generated for each season, or at a regular time interval, such as every week or every day.

As discussed above with reference to FIG. 1, power management system 140 has a building-level objective and a system-level objective. Both control objectives can be implemented using the processing power of the power management system 140, as opposed to separate controllers located within each building. The building-level objective is to reduce electricity cost for the user while satisfying the user-defined constraints provided by user 130. In one embodiment, the number of operation commands transmitted to the energy storage device 115 is less than three per day. In one embodiment, the building-level objective can be achieved using a control strategy formulated as a mixed-integer linear programming problem, as shown by equations (2)-(13) below:

$$\max \Sigma_{i=1}^{N} \quad (2)$$
$$[c(\Delta t_i) \cdot P_{grid}(\Delta t_i) \cdot \Delta t + c_{ES} \cdot (SU_{charging}(\Delta t_i) + SU_{discharging}(\Delta t_i))]$$

$$\text{s.t. } P_{grid}(\Delta t_i) = \quad (3)$$
$$s_{heating}(\Delta t_i) \cdot P_{heating} + s_{cooling}(\Delta t_i) \cdot P_{cooling} + s_{WH}(\Delta t_i) \cdot P_{WH} +$$
$$s_{ES}^{charging}(\Delta t_i) P_{ES}^{charging} - s_{ES}^{discharging}(\Delta t_i) P_{ES}^{discharging} +$$
$$P_{uncontrollable}(\Delta t_i) - s_{PV}(\Delta t_i) \cdot P_{PV}(\Delta t_i) \quad 1 \leq i \leq N$$

$$0 \leq P_{grid}(\Delta t_i) \leq P_{max} \quad 1 \leq i \leq N \quad (4)$$

-continued $$T(\Delta t_i) = \tag{5}$$
$$T(\Delta t_i) + 3600 \cdot \frac{\Delta t}{c_p} \cdot \left[ s_{heating}(\Delta t_i) COP_{heating} \cdot P_{heating} - s_{cooling}(\Delta t_i) \cdot \right.$$
$$\left. COP_{cooling} \cdot P_{cooling} + \frac{T_{amb}(\Delta t_i) - T(\Delta t_i)}{R_{room}} + \right.$$
$$\left. D \cdot I(\Delta t_i) + P_d(\Delta t_i) \right] \quad 1 \leq i \leq N$$

$$T_{min}(\Delta t_i) \leq T(\Delta t_i) \leq T_{max}(\Delta t_i) \quad 2 \leq i \leq N+1 \tag{6}$$

$$E_{ES}(\Delta t_{i+1}) + s_{ES}^{charging}(\Delta t_i) \cdot P_{ES}^{charging} \cdot -\Delta t \cdot \eta_{charging} - \tag{7}$$
$$\frac{s_{ES}^{charging}(\Delta t_i) \cdot P_{ES}^{discharging} \cdot \Delta t}{\eta_{discharging}} \quad 1 \leq i \leq N$$

$$E_{ES}^{min} \leq E_{ES}(\Delta t_i) \leq E_{ES}^{max} \quad 2 \leq i \leq N+1 \tag{8}$$

$$s_{ES}^{charging}(\Delta t_i) + s_{ES}^{discharging}(\Delta t_i) \leq 1 \quad 1 \leq i \leq N \tag{9}$$

$$s_{ES}^{charging}(\Delta t_{i+1}) - s_{ES}^{charging}(\Delta t_i) - SU_{charging}(\Delta t_i) \leq 0 \quad 1 \leq i \leq N \tag{10}$$

$$s_{ES}^{discharging}(\Delta t_{i+1}) - s_{ES}^{discharging}(\Delta t_i) - SU_{discharging}(\Delta t_i) \leq 0 \quad 1 \leq i \leq N \tag{11}$$

$$T_{WH}(\Delta t_{i+1}) = \tag{12}$$
$$T_{WH}(\Delta t_i) + \frac{3600 \cdot \Delta t}{c_{WH}} [s_{WH}(\Delta t_i) \cdot P_{WH} \cdot \eta_{WH} - P_{WH}^{demand}(\Delta t_i)] \quad 1 \leq i \leq N$$

$$T_{WH}^{max}(\Delta t_i) \leq T_{WH}(\Delta t_i) \leq T_{WH}^{max}(\Delta t_i) \quad 1 \leq i \leq N \tag{13}$$

The variables of equation (2)-(13) above are identified as follows:
i: iteration index;
N: total planning intervals in the optimization problem;
$COP_{heating}$: air conditioner coefficient of performance in heating mode;
$COP_{cooling}$: air conditioner coefficient of performance in cooling mode;
$P_{heating}$: air conditioner electric power demand in heating mode (kW);
$P_{cooling}$: air conditioner electric power demand in cooling mode (kW);
$P_{WH}$: water heater electric power demand (kW);
$P_{ES}^{charging}$: ES charging power (kW);
$P_{ES}^{discharging}$: ES discharging power (kW);
$\Delta t$: time step (hour);
$c_{ES}$: the energy storage start-up charging/discharging cost;
$P_{max}$: maximum allowed power input from the utility grid (kW);
$C_p$: thermal capacitance (or thermal mass/inertia) for the thermal zone in the building (kJ/K);
$R_{room}$: thermal resistance between the thermal zone and the outdoor air;
D: coefficient of the solar irradiance;
$T_{min}(\Delta t_i)$: minimum limit of the room temperature in interval i(K);
$T_{max}(\Delta t_i)$: maximum limit of the room temperature in interval i(K);
$\eta_{charging}$: ES charging efficiency;
$\eta_{discharging}$: ES discharging efficiency;
$E_{ES}^{min}$: minimum limit of the ES stored energy (kWh);
$E_{ES}^{max}$: maximum limit of the ES stored energy (kWh);
$C_{WH}$: thermal capacitance of the water heater (kJ/K);
$P_{WH}$: water heater electric power demand in interval i;
$\eta_{WH}$: electric water heater efficiency (90-95%);
$T_{WH}^{min}(\Delta t_i)$: minimum limit of the water heater temperature (K);
$T_{WH}^{max}(\Delta t_i)$: maximum limit of the water heater temperature (K);

The decision variables of the equation set above are defined as follows:
$P_{grid}(\Delta t_i)$: power input from the utility grid (kW);
$T(\Delta t_i)$: room temperature in interval i (K);
$SU_{charging}(\Delta t_i)$: 1—ES start-charging operation, 0—no start-charging operation;
$SU_{discharging}(\Delta t_i)$: 1—ES start-discharging operation, 0—no start-discharging operation;
$E_{ES}(\Delta t_i)$: ES stored energy in interval i (kWh);
$T_{WH}(\Delta t_i)$: water heater temperature (K);
$s_{heating}(\Delta t_i)$: control status of the air conditioner in heating mode (1—heating mode, and 0—idle);
$s_{cooling}(\Delta t_i)$: control status of the air conditioner in cooling mode (1—cooling mode, and 0—idle);
$s_{WH}(\Delta t_i)$: water heater on/off status in interval i;
$s_{ES}^{charging}(\Delta t_i)$: ES charging status in interval i (1—charging mode; 0—idle mode);
$s_{ES}^{discharging}(\Delta t_i)$: ES discharging status in interval i (1—discharging mode; 0—idle mode);
$s_{PV}(\Delta t_i)$: PV system on/off status or power set-point in interval i (can be varied between 0 and 1).

The input signals of the equation set above are given as follows:
$c(\Delta t_i)$: electricity price in $/kWh (i=1, . . . , N);
$P_{uncontrollable}(\Delta t_i)$: uncontrollable load demand in kW (i=1, . . . , N);
$P_d(\Delta t_i)$: heat generated by other energy sources in kW (i=1, . . . , N);
$P_{PV}(\Delta t_i)$: maximum PV generation in kW (i=1, . . . , N);
$T_{amb}(\Delta t_i)$: ambient temperature in K (i=1, . . . , N);
$I(\Delta t_i)$: solar irradiance in kW/m (i=1, . . . , N);
$P_{WH}^{demand}(\Delta t_i)$: water heater load demand in kW (i=1, . . . , N).

Finally, the control commands for the thermal loads are given as follows:
$s_{PV}(\Delta t_i)$: PV system on/off status or power set-point (i=1, . . . , N);
$s_{heating}(\Delta t_i)$: air conditioner control status (i=1, . . . , N);
$s_{WH}(\Delta t_i)$: water heater on/off status (i=1, . . . , N);
$s_{ES}^{charging}(\Delta t_i)$: ES charging and discharging status (i=1, . . . , N).

The building-level control strategy is used to plan operation of a building's devices. For example, power management system 140 may generate a 12 hour time period of load commands and operation commands, which can be transmitted to interface device 120 and stored in memory on the interface device 120 until the scheduled time of execution.

With continuing reference to FIG. 1, power management system 140 is structured to provide ancillary service to the grid, which includes disturbing controllable loads, such as thermal load 119, thermal storage load 111, and energy storage device 115. The system-level objective is to minimize the difference between the final solution and the building-level control strategy described above while satisfying the utility available power constraint and the user-defined constraints. In one embodiment, a system-level control strategy can be formulated as a mixed-integer linear programming problem, as shown by the equation set below:

$$\min \Sigma_{j=1}^{M} \left[ (SD_j^{heating}(\Delta t_i) + SU_j^{heating}(\Delta t_i)0 \cdot P_j^{heating} + \right. \tag{14}$$
$$\left. (SD_j^{cooling}(\Delta t_i) + SU_j^{cooling}(\Delta t_i)) \cdot P_j^{cooling} + \right.$$
$$\left. (SD_j^{WH}(\Delta t_i) + SU_j^{WH}(\Delta t_i)) \cdot P_j^{WH} + \right.$$
$$\left. (SD_j^{charging}(\Delta t_i) + SU_j^{charging}(\Delta t_i)) \cdot P_j^{charging} + \right.$$
$$\left. (SD_j^{discharging}(\Delta t_i) + SU_j^{discharging}(\Delta t_i)) \cdot P_j^{discharging} + \right.$$
$$\left. (SD_j^{PV}(\Delta t_i) + SU_j^{PV}(\Delta t_i)) \cdot P_j^{PV}(\Delta t_i) \right] + C_0$$

-continued $$\text{s.t. } \sum_{j=1}^{M} \left[ P_j^{uncontrollable}(\Delta t_i) + P_j^{heating} \cdot s_j^{heating\ F}(\Delta t_i) + \right.$$
$$P_j^{cooling} \cdot s_j^{cooling\ F}(\Delta t_i) + P_j^{WH} \cdot s_j^{WH_F}(\Delta t_i) +$$
$$P_j^{charging} \cdot s_j^{charging\ F}(\Delta t_i) - P_j^{discharging} \cdot s_j^{discharging\ F}(\Delta t_i) -$$
$$\left. P_j^{PV}(\Delta t_i) \cdot s_j^{PV\ F}(\Delta t_i) \right] \le P_{utility}(\Delta t_i) + C_0 \quad (15)$$

$$C_0 \ge 0 \quad (16)$$

$$T_j(\Delta t_{i+1}) = \quad (17)$$
$$T_j(\Delta t_i) + 3600 \cdot \frac{\Delta t}{c_p^j} \cdot \left[ s_j^{heating\ F}(\Delta t_i) \cdot COP_j^{heating} \cdot P_j^{heating} - s_j^{cooling\ F}(\Delta t_i) \cdot COP_j^{cooling} \cdot P_j^{cooling} + (T_{amb}^j(\Delta t_i) - T_j(\Delta t_i))/R_{room}^j + D \cdot I_j(\Delta t_i) + P_d^j(\Delta t_i) \right] \ 1 \le j \le M$$

$$T_j^{min}(\Delta t_{i+1}) \le T(\Delta t_{i+1}) \le T_j^{max}(\Delta t_{i+1}) \ 1 \le j \le M \quad (18)$$

$$s_j^{heating\ F}(\Delta t_i) + s_j^{cooling\ F}(\Delta t_i) \le 1 \ 1 \le j \le M \quad (19)$$

$$s_j^{heating\ F}(\Delta t_i) - s_j^{heating\ F}(\Delta t_i) - SU_j^{heating}(\Delta t_i) \le 0 \ 1 \le j \le M \quad (20)$$

$$s_j^{heating\ F}(\Delta t_i) - s_j^{heating\ F}(\Delta t_i) - SD_j^{heating}(\Delta t_i) \le 0 \ 1 \le j \le M \quad (21)$$

$$s_j^{cooling\ F}(\Delta t_i) - s_j^{cooling\ F}(\Delta t_i) - SU_j^{cooling}(\Delta t_i) \le 0 \ 1 \le j \le M \quad (22)$$

$$s_j^{cooling\ F}(\Delta t_i) - s_j^{cooling\ F}(\Delta t_i) - SD_j^{cooling}(\Delta t_i) \le 0 \ 1 \le j \le M \quad (23)$$

$$s_j^{WH\ F}(\Delta t_i) - s_j^{WH\ F}(\Delta t_i) - SU_j^{WH}(\Delta t_i) \le 0 \ 1 \le j \le M \quad (24)$$

$$s_j^{WH\ F}(\Delta t_i) - s_j^{WH\ F}(\Delta t_i) - SD_j^{WH}(\Delta t_i) \le 0 \ 1 \le j \le M \quad (25)$$

$$T_j^{WH}(\Delta t_{i+1}) = T_j^{WH}(\Delta t_i) + \quad (26)$$
$$3600 \cdot \frac{\Delta t}{c_{WH}^j [s_j^{WH\ F}(\Delta t_i) \cdot P_j^{WH} \cdot \eta_j^{WH} - P_{j\ WH}^{demand}(\Delta t_i)]} \ 1 \le j \le M$$

$$T_{j\ WH}^{min}(\Delta t_{i+1}) \le T_j^{WH}(\Delta t_{i+1}) \le T_{j\ WH}^{max}(\Delta t_{i+1}) \ 1 \le j \le M \quad (27)$$

$$s_j^{charging\ F}(\Delta t_i) + s_j^{discharging\ F}(\Delta t_i) \le 1 \ 1 \le j \le M \quad (28)$$

$$s_j^{charging\ F}(\Delta t_i) - s_j^{charging\ F}(\Delta t_i) - SU_j^{charging}(\Delta t_i) \le 0 \ 1 \le j \le M \quad (29)$$

$$s_j^{heating\ F}(\Delta t_i) - s_j^{charging\ F}(\Delta t_i) - SD_j^{charging}(\Delta t_i) \le 0 \ 1 \le j \le M \quad (30)$$

$$s_j^{discharging\ F}(\Delta t_i) - s_j^{discharging\ F}(\Delta t_i) - SU_j^{discharging}(\Delta t_i) \le 0 \ 1 \le j \le M \quad (31)$$

$$s_j^{discharging\ F}(\Delta t_i) - s_j^{discharging\ F}(\Delta t_i) - SD_j^{discharging}(\Delta t_i) \le 0 \ 1 \le j \le M \quad (32)$$

$$E_j^{ES}(\Delta t_{i+1}) = E_j^{ES}(\Delta t_i) + s_j^{charging\ F}(\Delta t_i) \cdot P_j^{charging\ F} \cdot \Delta t \cdot \eta_j^{charging} - \frac{s_h^{discharging}(\Delta t_i) \cdot P_j^{discharging\ D} \cdot \Delta t}{\eta_j^{discharging}} \quad (33)$$

$$E_{j\ ES}^{min} \le E_j^{ES}(\Delta t_{i+1}) \le E_{j\ ES}^{max} \ 1 \le j \le M \quad (34)$$

$$s_j^{PV\ F}(\Delta t_i) - s_j^{PV\ F}(\Delta t_i) - SU_j^{PV}(\Delta t_i) \le 0 \ 1 \le j \le M \quad (35)$$

$$s_j^{PV}(\Delta t_i) - s_j^{PV\ F}(\Delta t_i) - SD_j^{PV}(\Delta t_i) \le 0 \ 1 \le j \le M \quad (36)$$

The coefficients in the equation set above are defined as follows:
j: building index;
M: total number of residential buildings;
$P_j^{heating}$: air conditioner electric power demand in heating mode (kW);
$P_j^{cooling}$: air conditioner electric power demand in cooling mode (kW);
$P_j^{WH}$: water heater electric power demand (kW);
$P_j^{charging}$: ES charging power (kW);
$P_j^{discharging}$: ES discharging power (kW);
$C_0$: a dual variable for constraint relaxation;
$C_p^j$: thermal capacitance of the thermal zone in the residential building (kJ/K);
$COP_{heating}^j$: air conditioner coefficient of performance in heating mode;
$COP_{cooling}^j$: air conditioner coefficient of performance in;
$R_{room}^j$: thermal resistance between the thermal zone and the outdoor air;
$D_j$: coefficient of the solar irradiance;
$T_j^{min}(\Delta t_{i+1})$: minimum limit of the room temperature (K);
$T_j^{max}(\Delta t_{i+1})$: maximum limit of the room temperature (K);
$C_{WH}^j$: thermal capacitance of the water heater (kJ/K);
$\eta_j^{WH}$: electric water heater efficiency (90-95%);
$T_{j\_WH}^{min}(\Delta t_{i+1})$: minimum limit of the water heater temperature (K);
$T_{j\_WH}^{max}(\Delta t_{i+1})$: maximum limit of the water heater temperature (K);
$\eta_j^{charging}$: ES charging efficiency;
$\eta_j^{dischargins}$: ES discharging efficiency;
$E_{j\_ES}^{min}$: minimum limit of the ES stored energy (kWh);
$E_{j\_ES}^{max}$: maximum limit of the ES stored energy (kWh);

The decision variables in the equation set above are defined as follows:
$SU_j^{heating}(\Delta t_i)$: 1—air conditioner start-heating mode operation, 0—no start-heating mode operation;
$SD_j^{heating}(\Delta t_i)$: 1—air conditioner stop-heating mode operation, 0—no stop-heating mode operation;
$SU_j^{cooling}(\Delta t_i)$: 1—air conditioner start-cooling mode operation, 0—no start-cooling mode operation;
$SD_j^{cooling}(\Delta t_i)$: 1—air conditioner stop-cooling mode operation, 0—no stop-cooling mode operation;
$SU_j^{WH}(\Delta t_i)$: 1—water heater start-up operation, 0—no start-up operation;
$SD_j^{WH}(\Delta t_i)$: 1—water heater shut down operation, 0—no shut down operation;
$SU_j^{charging}(\Delta t_i)$: 1—ES start-charging operation, 0—no start-charging operation;
$SD_j^{charging}(\Delta t_i)$: 1—ES stop-charging operation, 0—no stop-charging operation;
$SU_j^{discharging}(\Delta t_i)$: 1—ES start-discharging operation, 0—no start-discharging operation;
$SD_j^{discharging}(\Delta t_i)$: 1—ES stop-discharging operation, 0—no stop-discharging operation;
$SU_j^{PV}(\Delta t_i)$: 1—PV system start-up operation, 0—no start-up operation;
$SD_j^{PV}(\Delta t_i)$: 1—PV system shut down operation, 0—no shut own operation;
$s_j^{heating\ F}(\Delta t_i)$: final control status of the air conditioner in heating mode (1—heating mode, and 0—idle);
$s_j^{cooling\ F}(\Delta t_i)$: final control status of the air conditioner in cooling mode (1—cooling mode, and 0—idle);
$s_j^{WH\ F}(\Delta t_i)$: final water heater on/off status;
$s_j^{charging\ F}(\Delta t_i)$: final ES charging status (1—charging mode; 0—idle mode);
$s_j^{discharging\ F}(\Delta t_i)$: final ES discharging status (1—discharging mode; 0—idle mode);
$s_j^{PV\ F}(\Delta t_i)$: final PV system on/off status;
$T_j(\Delta t_i)$: room temperature (K);
$T_j^{WH}(\Delta t_i)$: water heater temperature (K);
$E_j^{ES}(\Delta t_i)$: ES stored energy (kWh).

The inputs for the equation set above are defined as follows:
$s_j^{heating}(\Delta t_i)$: initial control status of the air conditioner in heating mode (1: heating mode, and 0: idle);
$s_j^{cooling}(\Delta t_i)$: initial control status of the air conditioner in cooling mode (1: cooling mode, and 0: idle);
$s_j^{WH}(\Delta t_i)$: initial water heater on/off status;

$s_j^{charging}(\Delta t_i)$: initial ES charging status (1—charging mode; 0—idle mode);
$s_j^{discharging}(\Delta t_i)$: initial ES discharging status (1—discharging mode; 0—idle mode);
$s_j^{PV}(\Delta t_i)$: initial PV system on/off status;
$P_j^{uncontrollable}(\Delta t_i)$: uncontrollable load demand (kW);
$P_j^{PV}(\Delta t_i)$: maximum PV generation (kW);
$P_{utility}(\Delta t_i)$: available power from the utility (kW);
$T_{amb}^j(\Delta t_i)$: ambient temperature (K);
$I_j(\Delta t_i)$: solar irradiance (kW/m$^2$);
$P_d^j(\Delta t_i)$: heat generated by other energy sources (kW);
$P_{j\ WH}^{demand}(\Delta t_i)$: water heater load demand (kW).

The control commands for the building controllable building resources are as follows:
$s_j^{heating\ F}(\Delta t_i)$: final control status of the air conditioner ($1 \le j \le M$);
$s_j^{WH\ F}(\Delta t_i)$: final water heater on/off status ($1 \le j \le M$);
$s_j^{charging\ F}(\Delta t_i)$: final ES charging and discharging status ($1 \le j \le M$);
$s_j^{PV\ F}(\Delta t_i)$: final PV system on/off status ($1 \le j \le M$).

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A method for reducing peak power demands in a power distribution system, the system including a plurality of buildings structured to receive power from a utility grid, the buildings each having at least one controllable thermal load, the method comprising:
   forecasting a future aggregate power demand peak of the power distribution system with a central load controller;
   generating a thermal model for each controllable thermal load with the central load controller;
   receiving user-defined constraint data related to each controllable load including a temperature operating range with the central load controller;
   generating a plurality of optimized load commands based on the forecasted aggregate power demand, thermal models, and constraint data with the central load controller; and
   transmitting each load command with the central load controller to a unique thermal load by way of an interface device located within the same building associated with the thermal load,
   wherein the load commands from the central load controller include a set of instructions to precool or preheat a thermal load within the user-defined constraints before the time period when the forecasted aggregate power demand peak is forecasted to occur.

2. The method of claim 1, wherein one controllable thermal load is one of a water heater and an HVAC system.

3. The method of claim 1, wherein the precooling or preheating of the thermal loads eliminates the need to operate auxiliary power generators.

4. The method of claim 3, wherein the load commands are optimized such that a deviation from the non-disturbed condition of the thermal loads is minimized but still sufficient to eliminate the need to operate the auxiliary power generators.

5. The method of claim 4, additionally comprising:
   receiving utility grid pricing data with the central load controller; and
   transmitting a plurality of operation commands to the energy storage device by way of the interface device and a plurality of load commands to the thermal load by way of the interface device, the operation commands and load commands each having a set of instructions to operate the energy storage device and thermal load respectively so as to minimize the cost of power received from the utility grid.

6. The method of claim 1, wherein the method additionally comprises:
   receiving distributed energy resource data from a distributed energy resource with the interface device associated with the same building;
   receiving energy storage data from an energy storage device with the interface device located within the same building;
   transmitting the distributed energy storage data to the central load controller with the interface device;
   generating a plurality of optimized operation commands based on the forecasted aggregate power demand, thermal models, and constraint data with the central load controller; and
   transmitting each operation command with the central load controller to a unique distributed energy resource or energy storage device by way of the interface device located within the same building associated with the distributed energy resource or energy storage device.

7. The method of claim 1, additionally comprising optimizing the thermal model by identifying a plurality of known and estimated parameters and adjusting the weight of the estimated parameters in response to determining a difference between the expected temperature of each thermal load and the actual temperature of the same thermal load.

8. A system comprising:
   a microprocessor-based power management system in operative communication with a plurality of buildings located remotely from the power management system; and a plurality of communication interface devices provided at corresponding ones of the plurality of buildings, the interface devices being structured to provide communication between the power management system and a plurality of thermal energy storage ("TES") loads associated with respective ones of the plurality of buildings, the thermal energy storage loads being configured to receive electrical power from an electrical grid and to provide at least one of heating and cooling of an associated thermal energy storage medium using the electrical power;

wherein the power management system is structured to:
perform a plurality of building unit-specific optimizations each pertaining to a specific building unit of the plurality of buildings, each of the optimizations using a dynamic thermal model of the specific building unit, resident-defined preference parameters for the specific building unit, and electrical power pricing information to determine one or more control commands for one or more of the TES loads at the specific building unit, transmit to each of the plurality of interface devices the one or more control commands which correspond to the specific building unit at which each interface device is provided, evaluate a net power demand on the electrical power grid, if evaluation of the net power demand indicates an over power condition, determine one or more additional control commands for the one or more of the TES loads at the specific building, the one or more additional control commands being structured to reduce the net power demand on the electrical power grid while minimizing disruption to the resident-defined preference parameters, and transmit to each of the plurality of interface devices the one or more additional control commands corresponding to the specific building at which each interface device is provided.

9. The system of claim 8 wherein each of the optimizations is effective to minimize electrical power cost for its respective specific building over an operating period subject to the constraints of the resident-defined preference parameters for the specific building.

10. The system of claim 8 wherein each thermal model includes a plurality of known and unknown parameters and the power management system is structured to accurately generate a thermal model by assigning a weighted value to each parameters, comparing the thermal model results to historical temperature data, and adjusting the weighted value for one or more of the parameters so as due reduce the margin of error between the thermal model and the actual temperature.

11. The system of claim 8 wherein:
the interface devices are structured to provide communication between the power management system and a plurality of distributed energy resources associated with respective ones of the plurality of buildings; and
the power management system is structured to determine one or more ancillary service commands for the one or more of the distributed energy resources, the one or more ancillary service commands being structured to store power generated by the distributed energy resource in anticipation of providing the power during a forecast ancillary service period.

12. The system of claim 8 wherein an over power condition is a time period in which an auxiliary power generating device must be operated in order to meet the net power demand on the electrical power grid.

13. The system of claim 8 wherein the power management system includes a cloud server.

14. The system of claim 8 wherein the power management system is structured to receive weather data from a weather station and use the weather data to determine one or more control commands for one or more of the TES loads at the specific building unit.

15. A method for operating a power distribution system including a microprocessor-based power management system and a plurality of remote communication interface devices, each communication interface device corresponding to one building including at least one thermal energy storage (TES) load, the method comprising:
performing, with the power management system, a plurality of building unit-specific optimizations each pertaining to a specific building unit of the plurality of buildings, each of the optimizations using a dynamic thermal model of the specific building unit, resident-defined preference parameters for the specific building unit, and electrical power pricing information to determine one or more control commands for one or more of the TES loads at the specific building unit, Transmitting, with the power management system, to each of the plurality of interface devices the one or more control commands which correspond to the specific building unit at which each interface device is provided, evaluating, with the power management system, a forecasted net power demand on the power distribution system, if evaluation of the net power demand indicates an over power condition, determining, with the power management system, one or more additional control commands for the one or more of the TES loads at the specific building, the one or more additional control commands being structured to reduce the net power demand on the electrical power grid while minimizing disruption to the resident-defined preference parameters, and transmitting, with the power management system, to at least a portion of the plurality of interface devices the one or more additional control commands corresponding to the specific building at which each interface device is provided.

16. The method of claim 15 wherein performing the plurality of building unit-specific optimizations includes using weather data or utility grid data to determine the one or more control commands for one or more of the TES loads at the specific building unit.

17. The method of claim 15 wherein if evaluation of the net power demand does not indicate an over power condition, the one or more control commands transmitted to the interface devices with the power management system are structured to minimize the electric power cost for each of the plurality of buildings.

18. The method of claim 15 wherein at least one building includes a distributed energy resource and the power management system is structured to perform the plurality of building unit-specific optimizations using distributed energy resource data to determine one or more control commands for the one or more TES loads at the specific building unit including the distributed energy resource.

19. The method of claim 15 wherein each additional control command is structured to control a temperature setting of one of the TES loads.

20. The method of claim 19 wherein each additional control command is structured to operate one of the TES loads before the forecasted over power condition in order to reduce net power demand during the forecasted over power condition.

\* \* \* \* \*